(12) United States Patent
Grepper

(10) Patent No.: US 12,523,245 B1
(45) Date of Patent: Jan. 13, 2026

(54) PANEL FASTENING SYSTEM

(71) Applicant: William Ryan Grepper, Portland, OR (US)

(72) Inventor: William Ryan Grepper, Portland, OR (US)

( * ) Notice: Subject to any disclaimer, the term of this patent is extended or adjusted under 35 U.S.C. 154(b) by 0 days.

(21) Appl. No.: 18/205,660

(22) Filed: Jun. 5, 2023

Related U.S. Application Data

(60) Provisional application No. 63/473,535, filed on Jun. 6, 2022.

(51) Int. Cl.
F16B 5/06 (2006.01)

(52) U.S. Cl.
CPC .... F16B 5/0621 (2013.01); *F16B 2005/0671* (2013.01)

(58) Field of Classification Search
CPC .................. F16B 5/0621; F16B 2005/0671
See application file for complete search history.

(56) References Cited

U.S. PATENT DOCUMENTS

| | | | | |
|---|---|---|---|---|
| 3,029,486 A * | 4/1962 | Raymond | ............ | F16B 21/086 411/908 |
| 3,478,395 A * | 11/1969 | Flora | ............ | F16B 5/0621 52/718.05 |
| 4,506,419 A * | 3/1985 | Mitomi | ............ | F16B 21/082 24/581.1 |
| 7,337,505 B1 * | 3/2008 | Scroggie | ............ | F16B 5/0657 24/297 |
| 7,481,474 B2 * | 1/2009 | Higgins | ............ | F16B 21/086 24/297 |
| 7,954,206 B2 * | 6/2011 | Scroggie | ............ | F16B 5/126 24/453 |
| 9,938,997 B2 * | 4/2018 | Iwahara | ............ | F16B 5/0664 |
| 9,982,694 B2 * | 5/2018 | Scroggie | ............ | F16B 19/00 |
| 10,808,745 B1 * | 10/2020 | Javali | ............ | F16B 21/086 |
| 2009/0133228 A1 * | 5/2009 | Werner | ............ | B60R 13/0206 24/336 |
| 2009/0178249 A1 * | 7/2009 | Jalbert | ............ | F16B 35/06 403/14 |
| 2011/0314642 A1 * | 12/2011 | Diez Herrera | ............ | F16B 5/126 24/293 |
| 2014/0225355 A1 * | 8/2014 | Risdale | ............ | B60R 21/2338 24/295 |
| 2015/0252826 A1 * | 9/2015 | Cooley | ............ | F16B 2/20 24/499 |

(Continued)

*Primary Examiner* — David M Upchurch
(74) *Attorney, Agent, or Firm* — QuickPatents; Kevin Prince

(57) ABSTRACT

A fastening system for fixing a panel with a support structure that has an opening with a waist includes a clip having an upper section and a lower section. The upper section includes two or more resilient arms projecting upwardly and outwardly to define a deflection space therebetween. An aperture formed in the panel is adapted to receive the lower section of the clip. The opening in the support structure is adapted to receive the upper section of the clip. As such, with the lower section of the clip engaged with the aperture of the panel, the upper section of the clip is inserted into the opening of the support structure. The resilient arms flex inwardly as the upper section of the clip passes the waist of the opening, the resilient arms thereafter flexing outwardly to hold the panel to the support structure.

14 Claims, 8 Drawing Sheets

(56) References Cited

U.S. PATENT DOCUMENTS

2016/0016522 A1* 1/2016 Smith ................. B60R 13/0212
                                                          296/35.1
2017/0335877 A1* 11/2017 Steltz .................... F16B 5/0657
2019/0136894 A1*  5/2019 Leidig ................... F16B 21/086

* cited by examiner

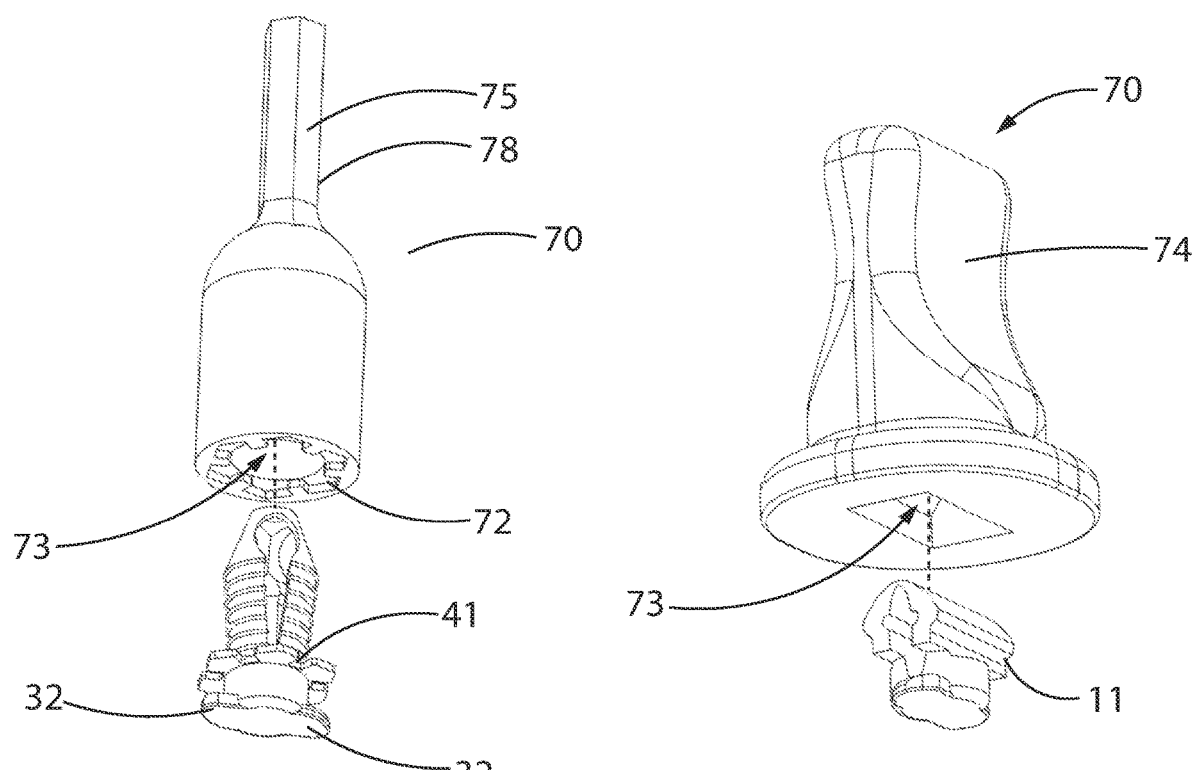
FIG. 10A
FIG. 10B
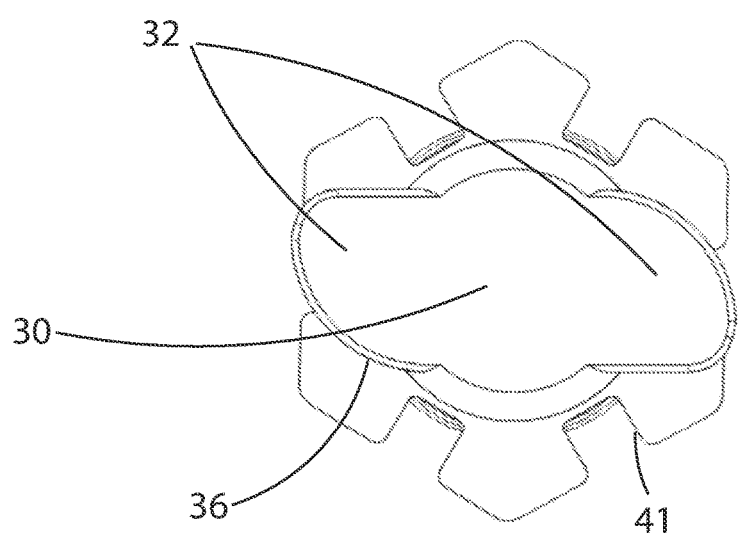
FIG. 11

PANEL FASTENING SYSTEM

CROSS-REFERENCE TO RELATED APPLICATIONS

This application claims the benefit of U.S. Provisional Patent Application 63/473,535, filed on Jun. 6, 2022, and is incorporated herein by reference.

STATEMENT REGARDING FEDERALLY SPONSORED RESEARCH AND DEVELOPMENT

Not Applicable.

FIELD OF THE INVENTION

This invention relates to fasteners, and more particularly to a panel fastening system.

BACKGROUND

The present invention generally relates to a fastener which can be used to attach panels to T-slot extrusions and to surfaces with holes such as the passenger compartment panels of automotive vehicles. This is particularly relevant in the van upfitting and conversion markets where original factory supplied panels are not provided, or the end customer is seeking a panel of a custom shape or material.

In a van conversion a customer may start with an empty van interior with bare metal walls, floor ceiling, etc. and wish to convert the van into an RV or recreational vehicle typically referred to as a camper van. The camper van layout is customized to the end customer's needs, and typically includes insulation, flooring, paneled walls and ceiling and may include a kitchen galley, storage boxes, bench seating and beds.

The materials used to create paneled walls and ceiling for van conversions are often a plywood that is covered with an upholstery or other material to improve the look of the finished interior of the van. One challenge with this process is that to attach the panels to the van support structures often includes either using sheet metal screws which leave unsightly screw heads visibly exposed, or complicated and expensive bracketing systems which must be precisely installed to retain the panels leaving the unsightly brackets visibly exposed.

A similar challenge is faced when building the accessories, such as kitchen galleys, storage areas, beds, etc. The inner frames for these accessories are typically built out of wood, welded metal, or T-slot extrusions. Very skilled builders must use time consuming cabinetry techniques to attach the finished panels to the accessories in a manner to not show the unsightly screw and mounting hardware. Aluminum T-slot extrusions are an optimum material to securely build a sturdy, lightweight frame, however in order to attach a panel to this material requires expensive bracket hardware and requires screwing into the back of the panel which is not possible in many situations.

As such currently used methods for attaching panels to automotive vehicles and T-slot extrusion accessory frames are unsightly, time consuming and/or expensive to achieve an unblemished visible surface. There exists a need for a fastening system which can be mounted into precisely located opening in panels which precisely align with existing apertures in automotive structures or precisely aligned channels in T-slot frames to securely attach the panel to the desired surface in the desired location. Such a fastening system would be relatively inexpensive and versatile, and intuitive to use. The present invention accomplishes these objectives.

SUMMARY OF THE INVENTION

The present device is a fastening system for fixing a panel with a support structure that has an opening with a waist. Such an opening may include a circular aperture, a non-circular aperture, an elongated slot, such as when the support structure is a so-called T-slot rail of extruded aluminum, or the like.

A clip has an upper section and a lower section. The upper section includes two or more resilient arms projecting upwardly and outwardly to define a deflection space therebetween. The resilient arms are each adapted to temporarily flex inwardly into the deflection space.

An aperture formed in the panel is adapted to receive the lower section of the clip. In preferred embodiments the aperture formed in the panel includes an oblong slot and an undercut. The lower section includes a shaft adapted to traverse the aperture of the panel, the shaft terminating in one or more laterally-extending projections adapted to traverse the oblong slot, such as two of the laterally-extending projections. The undercut captures the laterally-extending projections in the undercut when the clip is rotated, such as 20-degrees to 90-degrees, thereby retaining the clip in the aperture.

The opening in the support structure is adapted to receive the upper section of the clip. In a first embodiment of the clip, the upper section comprises two of the resilient arms that are elongated beyond the lower section of the clip to define an upper section lower surface. The elongated resilient arms are configured for insertion into the elongated slot of the support structure until the upper section lower surface contacts the support structure to prevent further insertion of the clip into the support structure. The elongated resilient arms include an outer contact surface adapted to contact and lock around the waist of the elongated slot when the lower section of the clip is fully engaged with the elongated slot of the support structure.

In a second embodiment of the clip, the resilient arms each include a plurality of outer ribs adapted to contact and lock around the waist of the opening of the support structure.

Such an embodiment preferably also includes a middle section fixed between the upper section and the lower section of the clip. The middle section includes a stop flange projecting outwardly therefore that includes an upper surface and a lower surface. The clip is configured for insertion into the aperture of the panel until the lower surface of the stop flange contacts the panel to prevent further insertion of the clip into the panel.

As such, with the lower section of the clip engaged with the aperture of the panel, the upper section of the clip is inserted into the opening of the support structure. The resilient arms flex inwardly as the upper section of the clip passes the waist of the opening, the resilient arms thereafter flexing outwardly to hold the panel to the support structure.

In some embodiments, a tool may be further included for facilitating installation and removal of the clip into the panel. In a first embodiment of the tool, the tool includes an inner edge and a recessed pocket conforming to and engaging the elongated resilient arms.

Preferably the stop flange has an outer peripheral edge that is non-circular in shape, such that the inner edge of the tool conforms to the non-circular shape of the outer peripheral edge of the stop flange. As such, a second embodiment of the tool is configured for engaging the outer peripheral edge of the stop flange of the clip, the upper section of the clip traversing the recessed pocket, to facilitate installation and removal of the clip from the panel.

The present invention offers an aesthetically pleasing, quick, and relatively inexpensive means to achieve an unblemished visible surface when connecting the panel to the support structure. The present system can be mounted into precisely-located openings in panels which perfectly align with existing apertures in automotive structures, or in channels in T-slot frames, so as to securely attach the panels to the desired support structure surface at desired locations. Other features and advantages of the present invention will become apparent from the following more detailed description, taken in conjunction with the accompanying drawings, which illustrate, by way of example, the principles of the invention.

DESCRIPTION OF THE DRAWINGS

FIG. 10A is a perspective view of a tool for engaging the second embodiment of the clip to facilitate attaching the clip to the panel;

FIG. 10B is a perspective view of a tool for engaging the first embodiment of the clip to facilitate attaching the clip to the panel; and FIG. 11 is a bottom plan view of the second embodiment of the clip.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 9A:
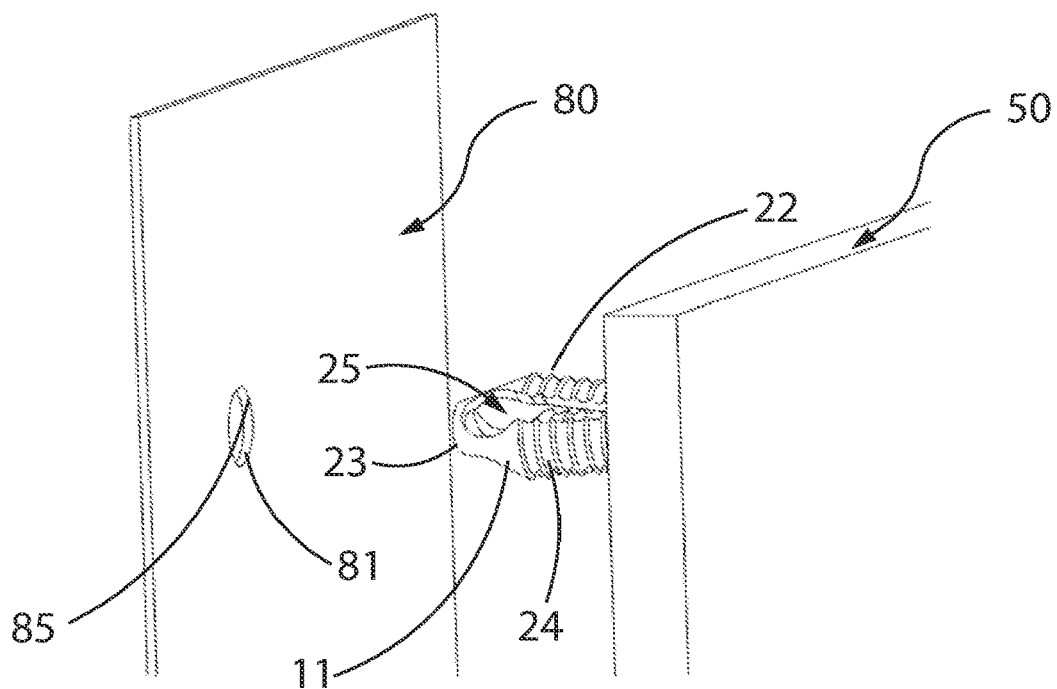
FIG. 9A is an exploded perspective view of a panel fixed with the second embodiment of the clip before insertion into an aperture of the support structure.
Figure 9B:
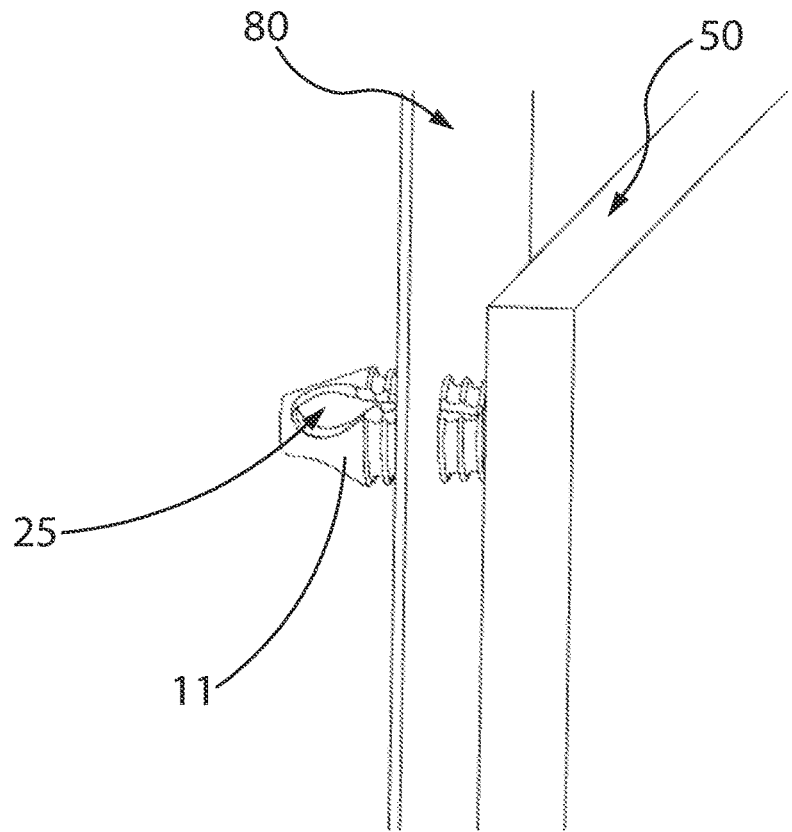
FIG. 9B is a perspective view of FIG. 9A once the clip is partially inserted into the support structure.

FIGS. 1-5B and 8A-8C illustrate a fastening system 10 for fixing a panel 50 with a support structure 80 that has an opening 81 with a waist 85. Such an opening 81 may include a circular aperture (FIG. 9A), an elongated slot 83 (FIGS. 8A-8C), such as when the support structure 80 is a so-called T-slot rail of extruded aluminum, or the like.

A clip 11 has an upper section 20 and a lower section 30. The upper section 20 includes two or more resilient arms 21 projecting upwardly and outwardly to define a deflection space 25 therebetween. The resilient arms 21 are each adapted to temporarily flex inwardly into the deflection space 25. Preferably the clip 11 is made from a semi-rigid rigid injection molded plastic material, or the like. Preferably, the resilient arms 21 meet at a tip 23 (FIGS. 1 and 2) that still allows the resilient arms 21 to flex. In some embodiments, the upper section 20 is made with a solid resilient, compressible material, such as a foam or elastomeric material, for example (not shown). In such an embodiment, the resilient arms 21 are integrally formed and are compressible inwardly. In other alternate embodiments, a resilient, compressible material fills the deflection space 25 (not shown).

An aperture 54 formed in the panel 50 is adapted to receive the lower section 30 of the clip 11. In preferred embodiments the aperture 54 formed in the panel 50 includes an oblong slot 55 and an undercut 59. The lower section 30 of the clip 11 includes a shaft 38 adapted to traverse the aperture 54 of the panel 50, the shaft 38 terminating in one or more laterally-extending projections 32 adapted to traverse the oblong slot 55, such as two of the laterally-extending projections 32. The undercut 59 captures the one or more laterally-extending projections 32 in the undercut 59 when the clip 11 is rotated, such as between 20-degrees to 90-degrees, thereby retaining the clip 11 in the aperture 54. Preferably each laterally-extending projection 32 includes an angled edge 35 (FIG. 1) for facilitating the capture of the laterally-extending projection 32 within the undercut 59.

The opening 81 in the support structure 80 is adapted to receive the upper section 20 of the clip 11. In a first embodiment of the clip 11 (FIGS. 1, 3A, 4A, 5A, 8A-8C, and 10B), the upper section 20 comprises two of the resilient arms 21 that are elongated beyond the lower section 30 of the clip 11 to define an upper section lower surface 26. The elongated resilient arms 21 are configured for insertion into the elongated slot 83 of the support structure 80 until the upper section lower surface 26 contacts the support structure 80 to prevent further insertion of the clip 11 into the support structure 80. The elongated resilient arms 21 include an outer contact surface 24 adapted to contact and lock around the waist 85 of the elongated slot 83 when the lower section 30 of the clip 11 is fully engaged with the elongated slot 83 of the support structure 80.

In a second embodiment of the clip 11 (FIGS. 2, 3B, 4B, 5B, 6, 9A-9B, 10A, and 11) the resilient arms 21 each include a plurality of outer ribs 22 adapted to contact and lock around the waist 85 of the opening 81 of the support structure 80. Such an embodiment preferably also includes a middle section 40 fixed between the upper section 20 and the lower section 30 of the clip 11. The middle section 40 includes a stop flange 41 projecting outwardly therefore that includes an upper surface 42 and a lower surface 43. The clip 11 is configured for insertion into the aperture 54 of the panel 50 until the lower surface 43 of the stop flange 41 contacts the panel 50 to prevent further insertion of the clip 11 into the panel 50.

As such, with the lower section 30 of the clip 11 engaged with the aperture 54 of the panel 50, the upper section 20 of the clip 11 is inserted into the opening 81 of the support structure 80. The resilient arms 21 flex inwardly as the upper section 20 of the clip 11 passes the waist 85 of the opening 81, the resilient arms 21 thereafter flexing outwardly to hold the panel 50 to the support structure 80.

In some embodiments, a tool 70 (FIGS. 10A and 10B) may be further included for facilitating installation and removal of the clip 11 into the panel 50. In a first embodiment of the tool 70, the tool 70 includes an inner edge 72 and a recessed pocket 73 conforming to and engaging the elongated resilient arms 21. The tool 70 is rotated either by hand at a manually-rotatable handle 74 (FIG. 10B) at an upper end 78 of the tool, or with an electric tool such as an electric drill (not shown) at a hexagonal shaft 75 (FIG. 10A) at the upper end 78 of the tool 70.

Figure 1:
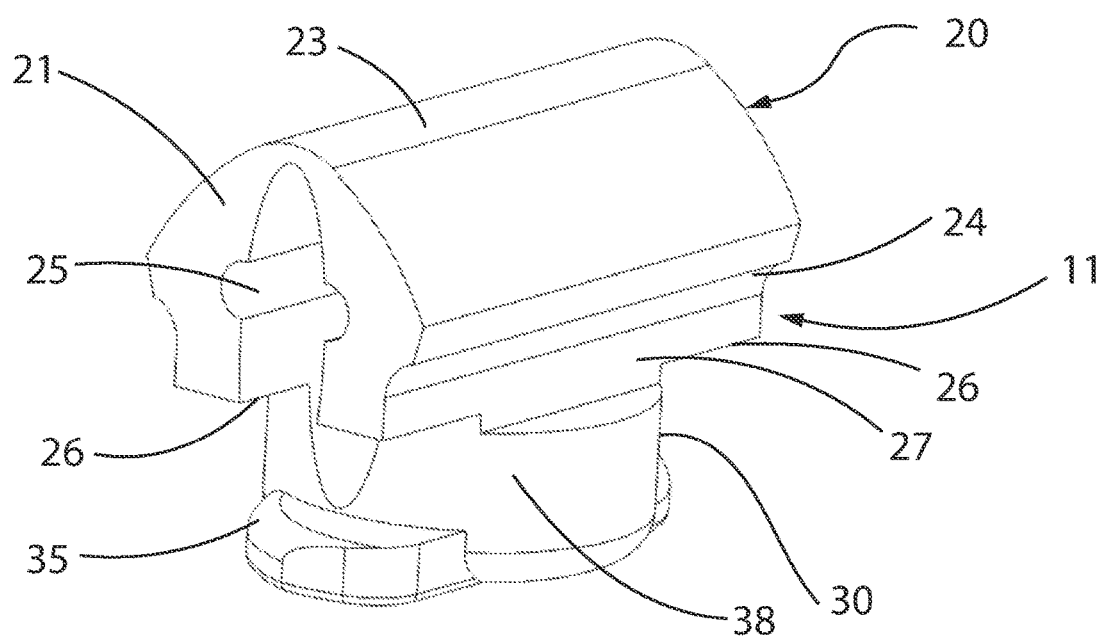
FIG. 1 is a perspective view of a first embodiment of the present invention, illustrating a first embodiment of a clip of the invention.
Figure 2:
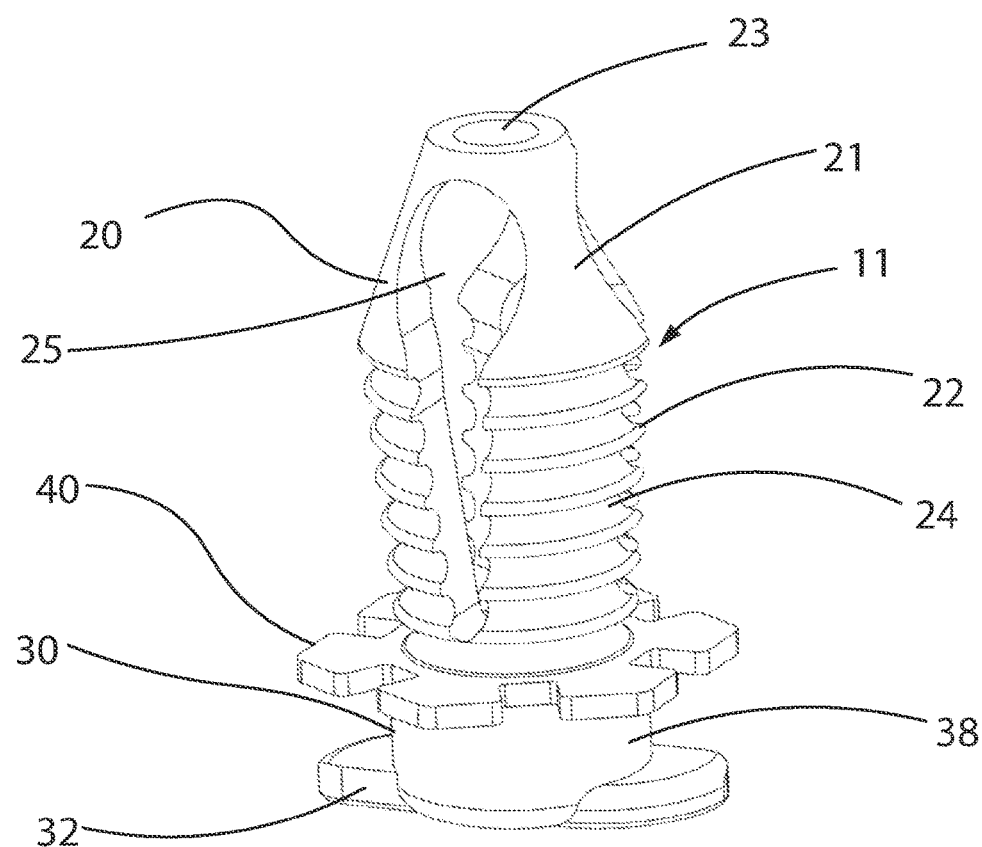
FIG. 2 is a perspective view of a second embodiment of the present invention, illustrating a second embodiment of a clip of the invention.
Figure 3A:
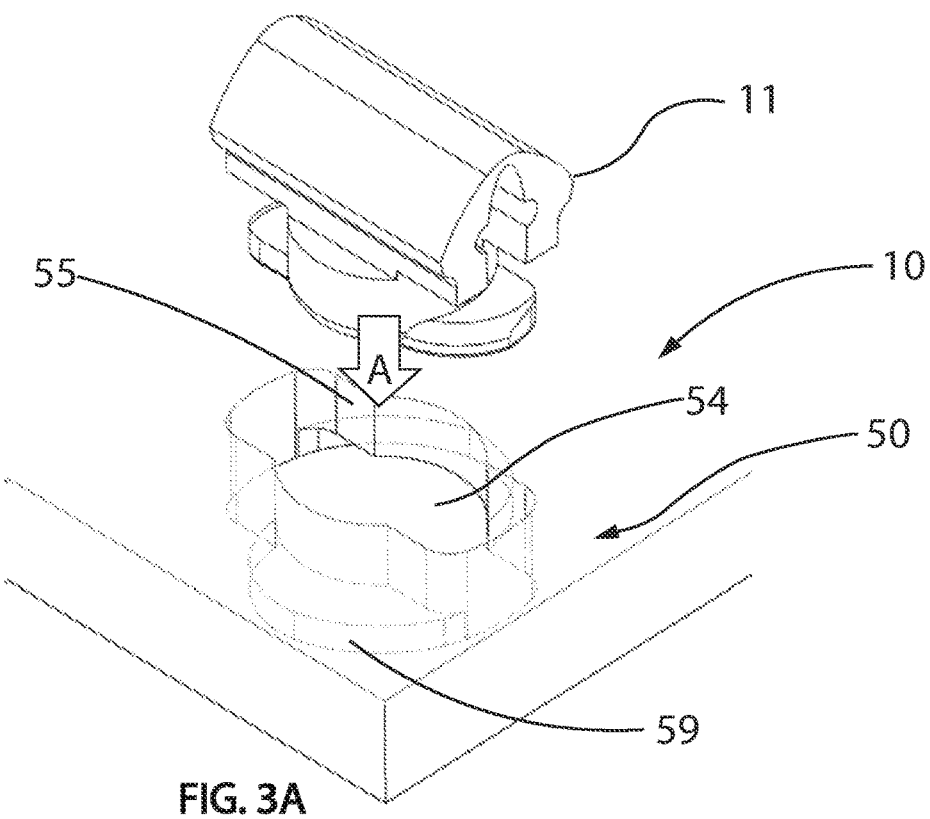
FIG. 3A is an exploded perspective view of the first embodiment of the clip before insertion into a slotted aperture formed in a panel.
Figure 3B:
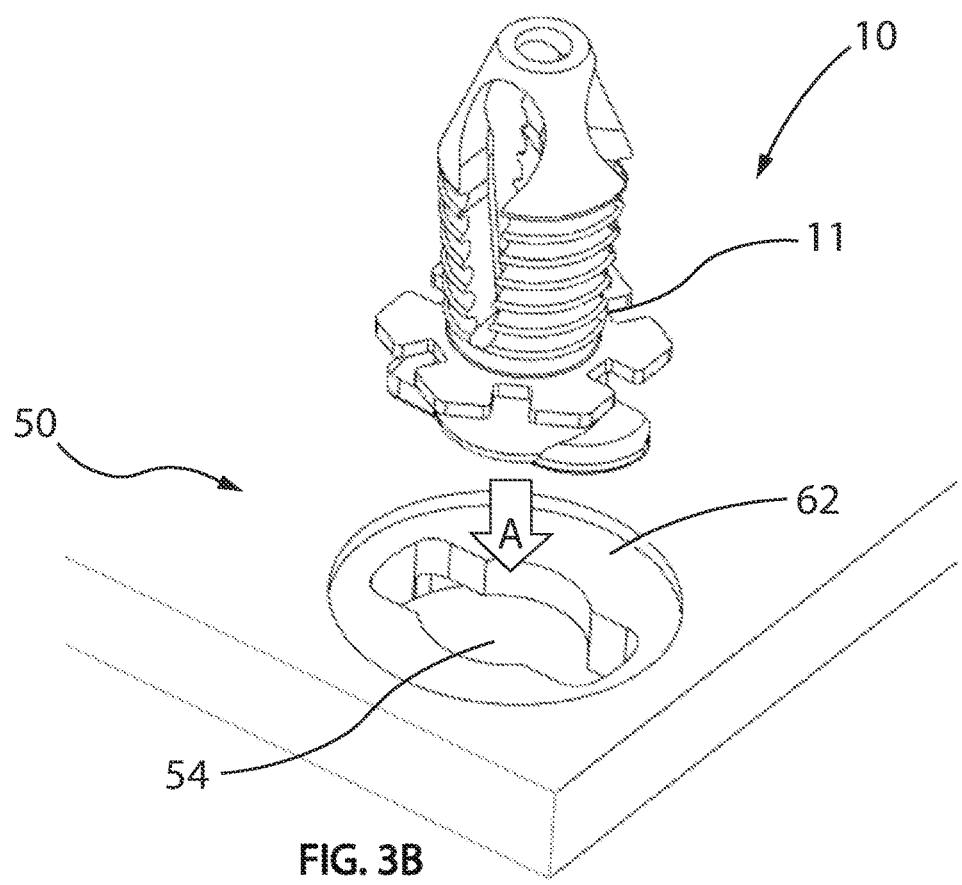
FIG. 3B is an exploded perspective view of the second embodiment of the clip before insertion into the slotted aperture formed in the panel.
Figure 4A:
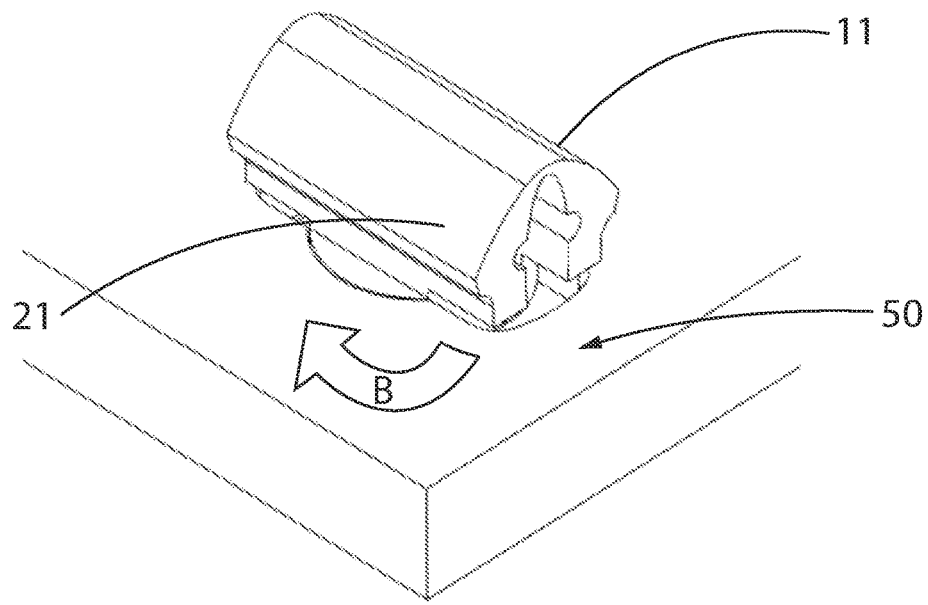
FIG. 4A is a perspective view of the first embodiment of the clip once inserted into the slotted aperture of the panel.
Figure 4B:
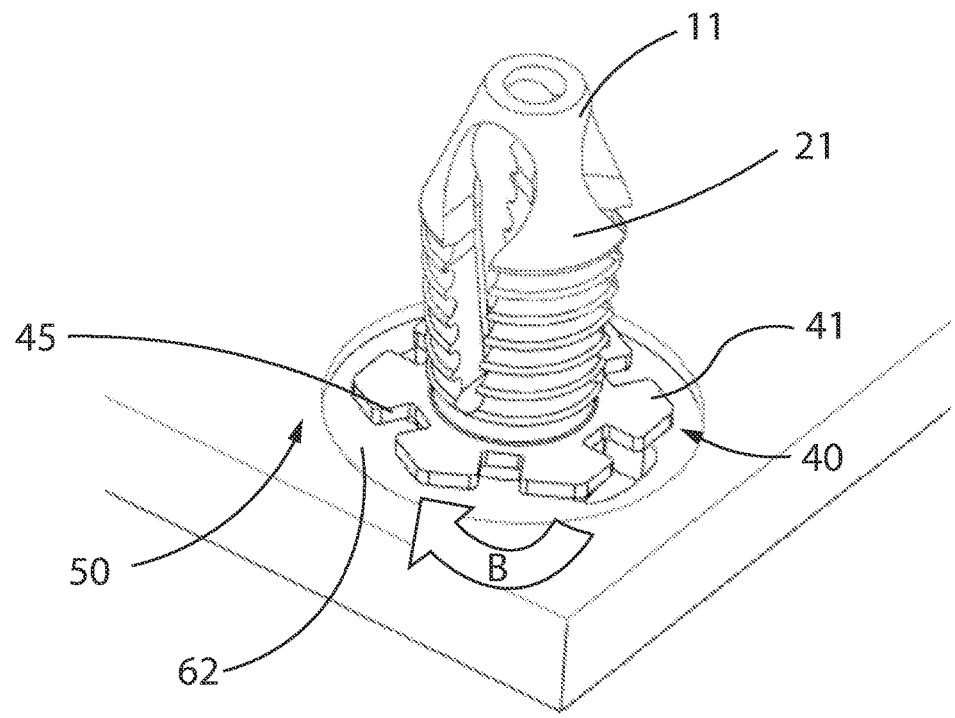
FIG. 4B is a perspective view of the second embodiment of the clip once inserted into the slotted aperture of the panel.
Figure 5A:
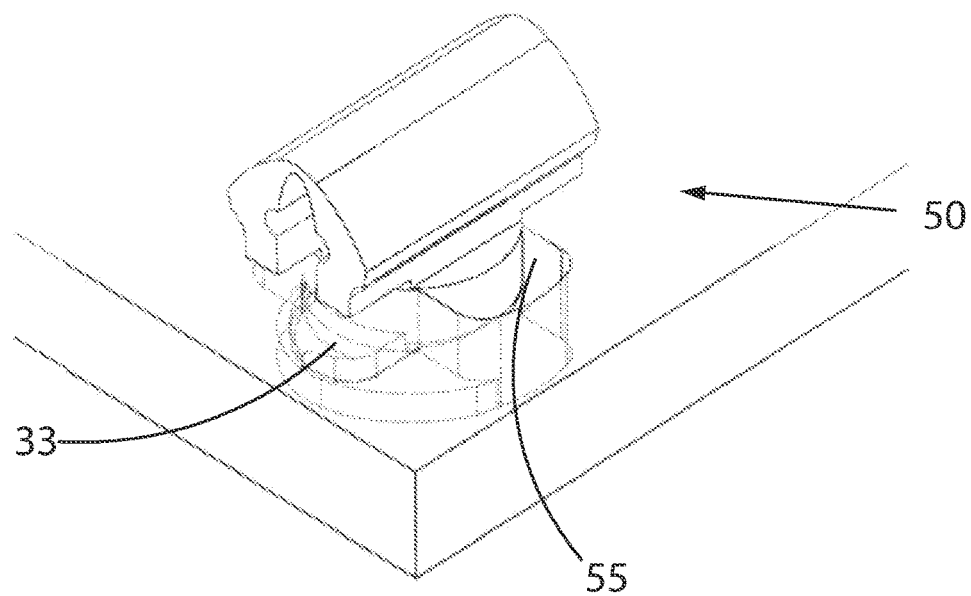
FIG. 5A is a perspective view of the first embodiment of the clip once inserted and twisted into the slotted aperture of the panel to lock the clip to the panel.
Figure 5B:
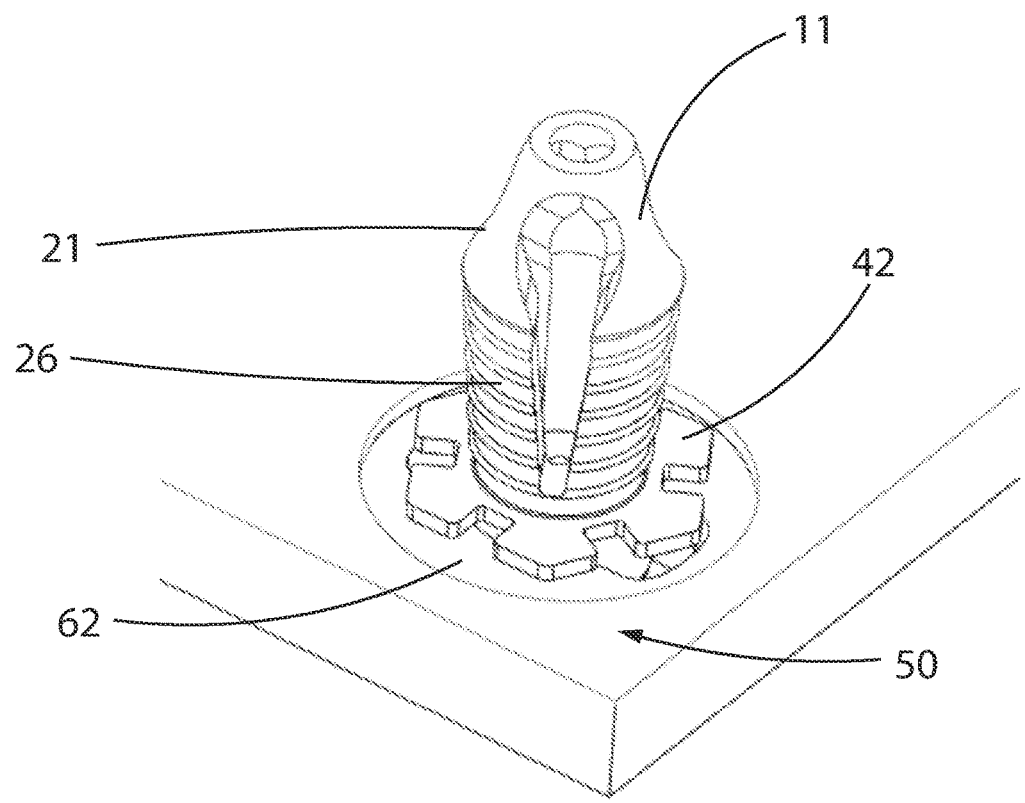
FIG. 5B is a perspective view of the second embodiment of the clip once inserted and twisted into the slotted aperture of the panel to lock the clip to the panel.
Figure 6:
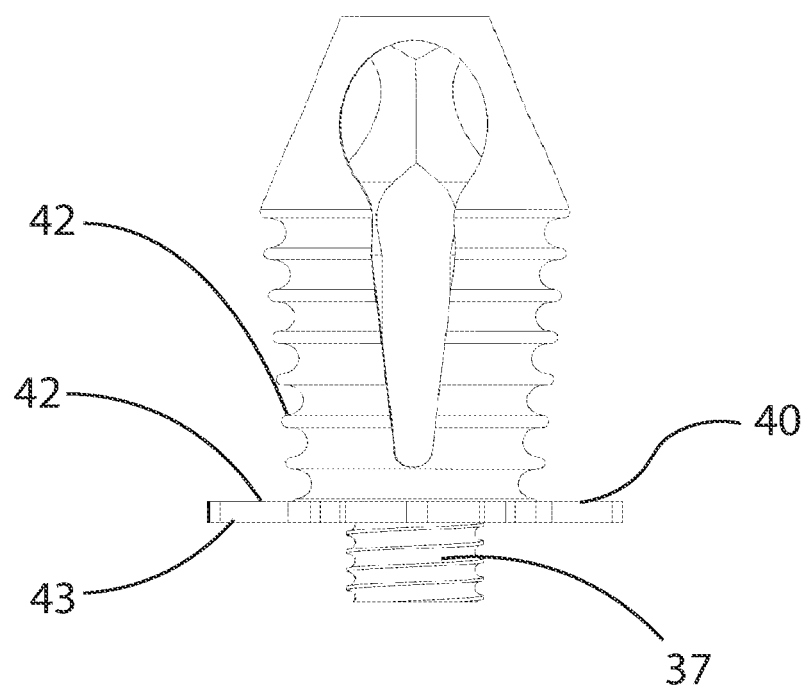
FIG. 6 is a side elevational view of the second embodiment of the clip.
Figure 7:
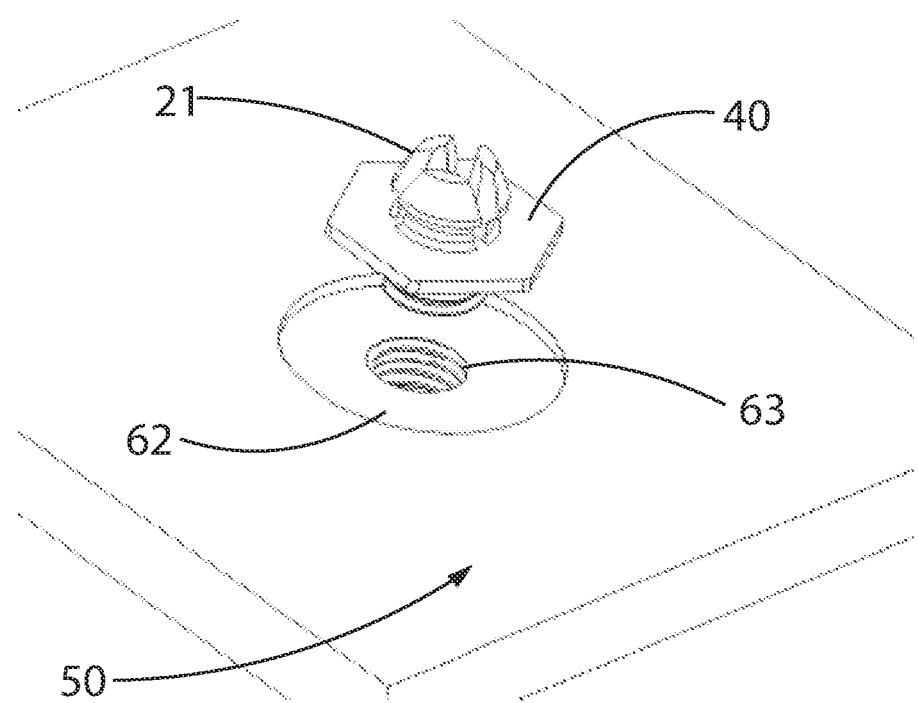
FIG. 7 is an exploded perspective view of an alternate embodiment of the invention, illustrated a threaded aperture in the panel and a threaded shaft on a lower section of the clip.
Figure 8A:
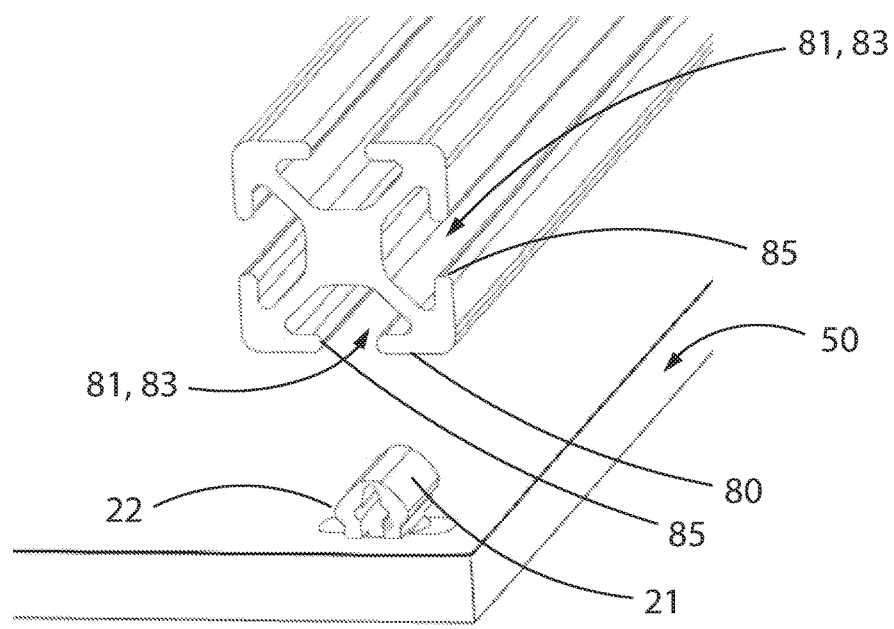
FIG. 8A is an exploded perspective view showing a T-slot rail support structure before insertion of the first embodiment of the clip therein.
Figure 8B:
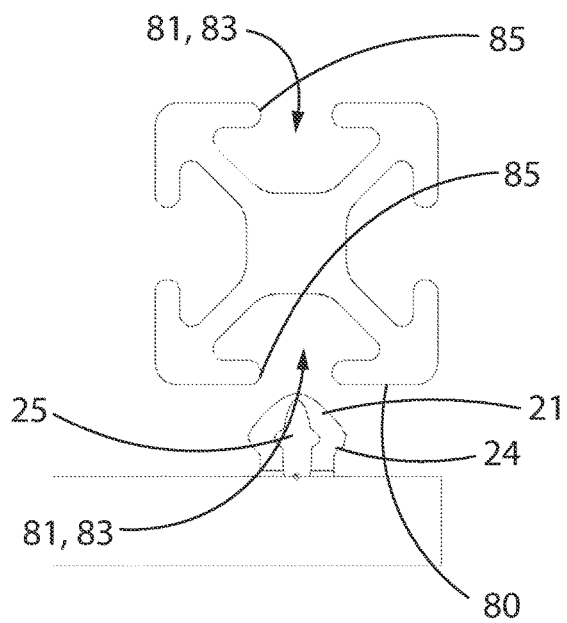
FIG. 8B is a side elevational view of FIG. 8A.
Figure 8C:
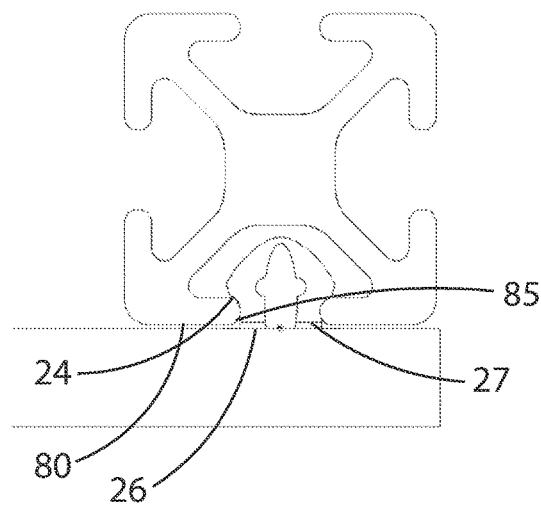
FIG. 8C is a side elevational view of the clip engaged with the T-slot rail support structure.

Preferably the stop flange 41 has an outer peripheral edge 45 that is non-circular in shape, such that the inner edge 72 of the tool 70 conforms to the non-circular shape of the outer peripheral edge 45 of the stop flange 41. Such a non-circular shape may be hexagonal (FIG. 7), complex (FIG. 4B), or the like. As such, a second embodiment of the tool 70 is configured for engaging the outer peripheral edge 45 of the stop flange 41 of the clip 11, the upper section 20 of the clip 11 traversing the recessed pocket 73, to facilitate installation and removal of the clip 11 from the panel 50.

In some embodiments, the aperture 54 of the panel 50 includes inner threads 63 (FIG. 7), and the lower section 30 of the clip 11 includes cooperative outer threads 37, such that the clip 11 can be screwed into the panel 50 to secure the clip 11 to the panel 50. Further, the aperture 54 of the panel 50 may include a surrounding tool recess 62 adapted to receive the tool 70 during installation of the clip 11 into the panel 50. A depth of the tool recess corresponds to a thickness of the stop flange 41, such that the upper surface 42 of the stop flange 41 is flush with the panel 50 when the clip 11 is fully engaged with the panel 50.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A fastening system for fixing a panel with a support structure having an opening with a waist, comprising:
    a clip having an upper section and a lower section, the upper section including two or more resilient arms projecting upwardly and outwardly to define a deflection space between the resilient arms, the resilient arms adapted to flex inwardly into the deflection space, the lower section including a shaft extending downwardly and away from the upper section in an axial direction of the shaft; and the panel and an aperture formed in the panel adapted to receive the lower section of the clip therein, the aperture of the panel having an engagement portion adapted to engage the lower section of the clip such that the clip is retained within the aperture of the panel when the lower section of the clip is engaged with the engagement portion of the aperture;

wherein the opening in of the support structure is adapted to receive the upper section of the clip;

wherein the lower section of the clip is configured for insertion into the aperture of the panel in the axial direction of the shaft, and such that the shaft of the lower section is capable of entering and moving into at least the engagement portion of the aperture of the panel in the axial direction of the shaft;

whereby with the lower section of the clip engaged with the aperture of the panel, the upper section of the clip is inserted into the opening of the support structure, the resilient arms flexing inwardly as the upper section of the clip passes the waist of the opening, the resilient arms thereafter flexing outwardly to hold the panel to the support structure.

2. The fastening system of claim 1 wherein the engagement portion of the aperture formed in the panel includes an oblong slot and an undercut, and wherein the shaft of the lower section of the clip terminates in one or more laterally-extending projections adapted to traverse the oblong slot, the undercut capturing the one or more laterally-extending projections in the undercut when the clip is rotated, thereby retaining the clip in the aperture of the panel.

3. The fastening system of claim 2 wherein the one or more laterally-extending projections is exactly two opposing laterally-extending projections.

4. The fastening system of claim 1 wherein the opening of the support structure includes an elongated slot, and wherein the upper section of the clip comprises two of the resilient arms, the resilient arms being elongated beyond the lower section of the clip to define an upper section lower surface, the elongated resilient arms configured for insertion into the elongated slot of the support structure until the upper section lower surface contacts the support structure to prevent further insertion of the clip into the support structure.

5. The fastening system of claim 4 wherein the elongated resilient arms include an outer contact surface adapted to contact and lock around the waist of the elongated slot when the lower section of the clip is fully engaged with the elongated slot of the support structure.

6. The fastening system of claim 4 further including a tool having an inner edge conforming to the elongated resilient arms of the clip, whereby the tool is configured for engaging the elongated resilient arms of the clip to facilitate installation and removal of the clip from the panel.

7. The fastening system of claim 1 wherein the resilient arms of the clip each include a plurality of outer ribs adapted to contact and lock around the waist of the opening of the support structure when the upper section of the clip is inserted into the opening of the support structure.

8. The fastening system of claim 1 wherein the clip further includes a middle section fixed between the upper section of the clip and the lower section of the clip, the middle section including a stop flange projecting outwardly therefrom that includes an upper surface and a lower surface, the clip configured for insertion into the aperture of the panel until the lower surface of the stop flange contacts the panel to prevent further insertion of the clip into the panel.

9. The fastening system of claim 8 wherein the stop flange includes an outer peripheral edge that has a non-circular shape.

10. The fastening system of claim 9 further including a tool having an inner edge conforming to the non-circular shape of the outer peripheral edge of the stop flange, whereby the tool is configured for engaging the outer peripheral edge of the clip to facilitate installation and removal of the clip from the panel.

11. The fastening system of claim 8 wherein the engagement portion of the aperture of the panel includes inner threads, and wherein the shaft of the lower section of the clip includes cooperative outer threads, the clip configured to be screwed into the panel to secure the clip to the panel.

12. The fastening system of claim 11 wherein the aperture of the panel includes a surrounding tool recess adapted to receive a tool during installation of the clip into the panel, a depth of the tool recess configured such that the upper surface of the stop flange is flush with the panel when the clip is fully engaged with the panel.

13. The fastening system of claim 6 wherein the tool includes a hexagonal shaft at an upper end thereof, the hexagonal shaft adapted to engage with a power tool.

14. The fastening system of claim 6 wherein the tool includes a manually-rotatable handle at an upper end thereof, whereby the tool can be manually rotated to engage the clip with the panel.

\* \* \* \* \*